June 26, 1934.   H. E. TAUTZ   1,964,652
SCROLL SAW
Filed Feb. 26, 1934   2 Sheets-Sheet 1
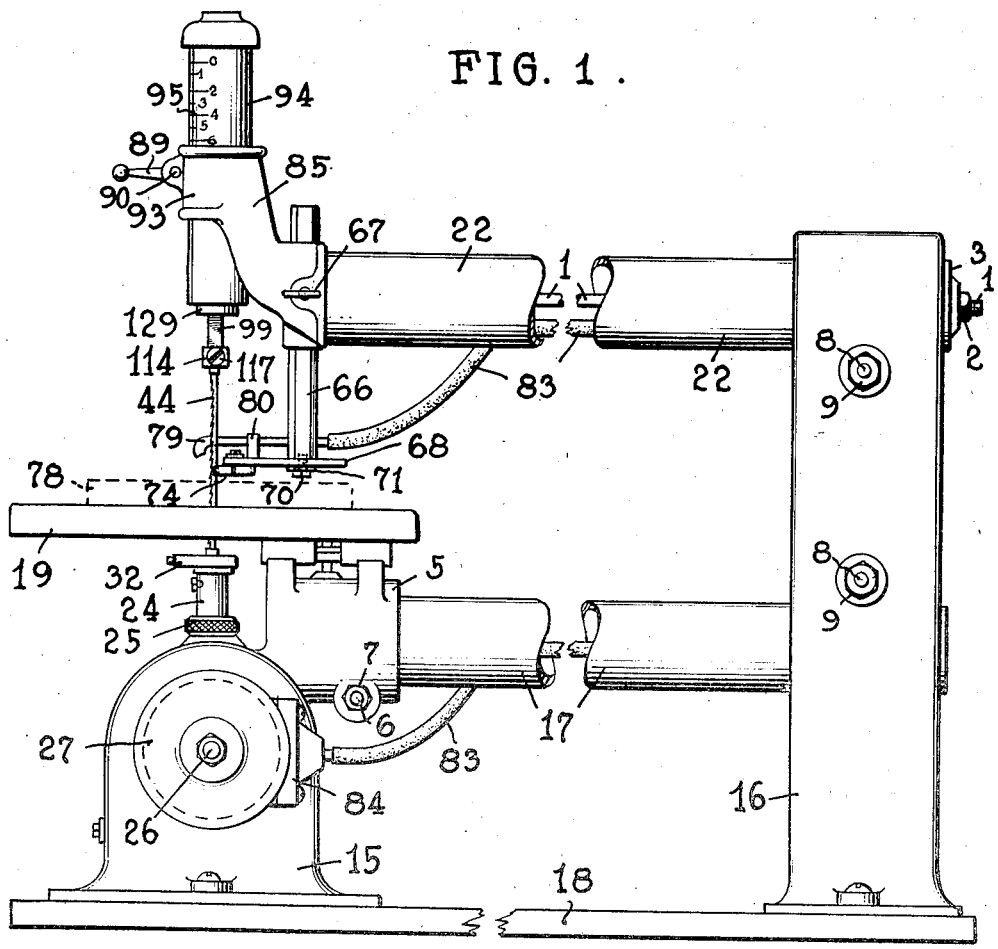
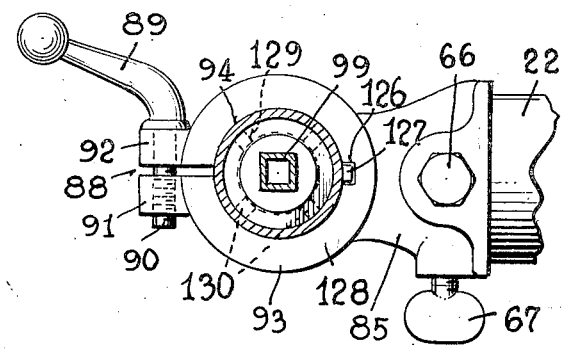
INVENTOR
HERBERT E. TAUTZ,
BY
Carl A. Hellmann,
ATTORNEY

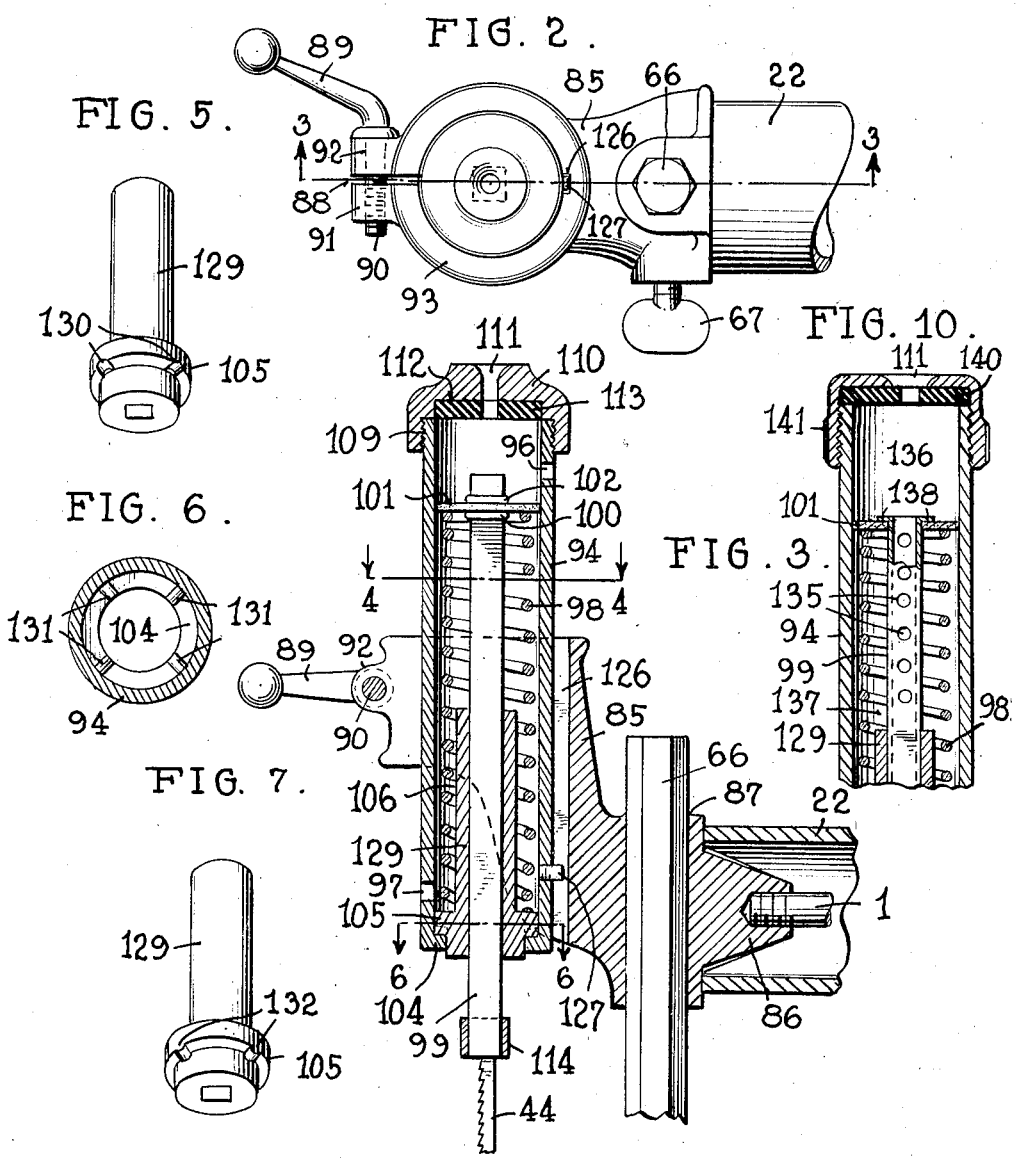

Patented June 26, 1934

1,964,652

UNITED STATES PATENT OFFICE 1,964,652

SCROLL SAW

Herbert E. Tautz, Milwaukee, Wis., assignor to Delta Manufacturing Company, Milwaukee, Wis.

Application February 26, 1934, Serial No. 713,060

16 Claims. (Cl. 143—70)

My invention relates to scroll saws.

More specifically it relates to improvements in the structure of the head of a scroll saw, particularly one of the type shown, for example, in my prior Patent No. 1,877,705.

Still more specifically, one feature of the present invention relates to means for controlling the tension of the saw blade of a scroll saw.

A further object of the invention is to provide improved means for lubricating the top guide for the saw blade.

More specifically, this object may be accomplished by making the said top guide for the saw blade of a material of the type commonly known as "self-lubricating", that is, a composition usually of a metallic substance and a preferably solid lubricant, such as graphite or the like, and which may be molded or machined into the desired shape.

A still further object is to provide improved means for changing the angular position of the saw blade with respect to the work, by means of a shiftable guide having stops controlling its end positions.

Other objects and advantages of my invention will be evident from the various features set forth in the present specification and defined in the claims appended thereto.

For a clear understanding of my invention, reference is to be had to the accompanying drawings, illustrative of an embodiment thereof.

In said drawings:

Fig. 1 is a side elevation of a scroll saw embodying the invention, portions being broken away, to permit illustrating the remaining details on a larger scale, Fig. 2 is a top plan view of the head end of the scroll saw shown in Fig. 1, on a larger scale, Fig. 3 is a longitudinal vertical section through the structure illustrated in Fig. 2, on the plane indicated by the line 3—3, Fig. 4 is a cross section through a portion of the head on the plane indicated by the line 4—4 of Fig. 3, the spring being omitted, Fig. 5 is a detail perspective view of an oilless bearing member illustrated in longitudinal section in Fig. 3, Fig. 6 is a cross section through the tubular casing of Fig. 3 on the plane indicated by the line 6—6 showing the projections formed in the lower flange thereof, Fig. 7 is a detail perspective view of a slightly modified form of oilless bearing member, Fig. 8 is a sectional view corresponding to Fig. 6, but showing a slightly modified form of the lower flange illustrated in Fig. 6, adapted to cooperate with the modified oilless bearing member of Fig. 7.

Fig. 9 is a sectional view similar to Fig. 6, but showing a still further modified form of the lower flange, adapted to cooperate with the oilless bearing member of Fig. 5, and Fig. 10 is a longitudinal vertical section through a slightly modified device similar to that shown in Fig. 3, certain portions being partly broken away and other portions omitted entirely.

In the various figures similar parts are designated by the same reference characters.

Referring first to Fig. 1, I have illustrated a scroll saw embodying certain features of my invention, together with a portion of my older form of scroll saw, in order to show how the invention is to be used. Hereinafter, of course, it will be clearly pointed out, both in the specification and in the claims, just which of the features disclosed in this figure are copied from my older invention and which features are believed to be new and patentable. In this figure, 15 designates a main drive housing which is fixedly secured to a rear support or standard 16 by means of the tubular arm 17, the housing 15 and the support 16 being preferably mountable upon a suitable base, such as 18.

A work table 19 is secured to the drive housing 15 and is mounted to tilt thereon about an axis lying preferably in the upper surface of the table and in line with the saw blade. The work table is provided with a suitable opening for the passage of the saw blade, and with means for securing the said table in any desired adjusted position about its axis.

The housing or crank case 15 contains suitable operating mechanism for reciprocating the lower plunger 24 which is mounted slidably in the bushing 25 secured to the housing. The power for operating the said plunger is transmitted thereto through the crank shaft 26 by means of the pulley 27 which may be rotated by any suitable motor or other source of power. A suitable chuck designated generally as 32 cooperates with the plunger 24 to hold the lower end of a saw blade 44 in order to reciprocate said saw blade through the table.

An air pump 84 is also secured to the housing 15 and actuated by said shaft 26 to provide an air blast which passes through the flexible tube 83 into the tubular arm 17, said tube passing thence upward through the standard 16 and into the upper tubular arm 22, and finally terminating in a nozzle tube 79 adjustably secured in a support 80, to blow away the sawdust from the upper surface of the workpiece 78 resting upon the table 19.

The lower tubular member 17 may be secured to the housing 15 in any desired way, for example by being mounted in a suitable lug 5 secured to the housing 15 and split longitudinally at its lower part, in cooperation with a bolt 6 and nut 7 which will clamp the split lug 5 closely against the member 17. The tubular members 17 and 22 are secured to the rear standard 16 in any desired manner, preferably by providing suitable bores extending through the said standard, the portion of the standard between said bores being slit, and drawn together by means of the bolts 8 and nuts 9 in the manner customary and well known in machine construction.

A preferably polygonal rod 66, in the present case shown as hexagonal in cross section, has a bar 68 adjustably secured to its lower end, for example, by means of a bolt 70, a washer 71 being interposed between the bar and the head of the bolt. The support 80 for the nozzle 79 is also secured to this bar 68 in any desired manner and said bar 68 likewise supports adjustably the rotatable head 74 which has a series of slots at its periphery adapted to receive saw blades 44 of varying widths and thicknesses. All the features so far described are old and are already disclosed in the prior patent, above mentioned, and are described herein merely to illustrate how the improved features cooperate with the old structure.

Referring now to the head designated by reference character 85, in Figs. 1, 2, 3 and 4, it will be noted that this head takes the place of the head 23 disclosed in the prior patent, and is secured rigidly in position and in alinement by means of a rod 1 threaded into a projecting portion thereof as shown at 86 in Fig. 3, said rod extending through the tubular member 22 and being rigidly secured to the other end of said member and to the standard 16 by means of a washer 3 and a nut 2. The rod 66, already mentioned, passes through a suitably formed guideway 87 in the head 85 and is secured at any desired elevation by means of the thumb screw or the like 67, shown in Figs. 1, 2 and 4. It will be noted that the head 85 differs from the head 23 of the prior patent in that instead of extending in a generally horizontal direction as a continuation of the tube 22 it extends upward above said tube, as clearly shown in Figs. 1 and 3. It differs also from the former construction in that it is preferably split in front, as shown best in Figs. 2 and 4 at 88 and a bolt 90, having an operating lever 89 secured thereto, is threaded into one portion 91 of said split part, while it passes freely through the other part 92 so that the two parts may be drawn together or again released by proper manipulation of the arm 89.

The cylindrical portion 93 of the said head 85 encircles and fits fairly closely about a tubular member 94 which may be freely moved up or down within the head 85, when the bolt 90 is loosened sufficiently, and again clamped in any desired portion of vertical adjustment by tightening the said bolt. The member 94, the internal construction of which is best shown in Fig. 3, has, preferably at the forward portion of its outer surface, a suitable scale 95, as in Fig. 1. The scale 95 is preferably so located as to cooperate with the upper surface of the head 85. Within the tube 94 there is a spring 98 which serves to tension the saw blade 44 which is secured to the lower end of a tubular element 99 of polygonal cross section, preferably square, as shown in Fig. 4. Near its top portion the said tubular member 99 may be provided with suitable retaining means 100 such, for example, as a bulge or flare of the tube, and a washer 101 of suitable material, for example, fibre or metal, is slipped upon the tube above said expanded portion 100 and secured against the same in any suitable manner, for example, by forming another similar expanded portion 102 in the tube above the said washer 101.

The tubular member 99 is mounted to be freely slidable in a guide or sleeve 129 formed of a suitable composition, such as anti-friction composition, sometimes known as an oilless bearing. Such bearings in and of themselves are already well known in the art and form no part of the present invention. They may consists, for example, of a composition comprising graphite or other suitable solid lubricant together with a binder which enables molding the whole into the desired shape.

It will be noted that this oilless bearing is preferably rotatably mounted in the tube 94, that is, it is rotatable about the longitudinal axis of said tube. The said tube 94 has an inwardly extending flange 104 formed at its lower end. The said oilless bearing member preferably has an enlarged portion 105 against which one end of the spring 98 may abut, and an elongated portion 106 surrounding the polygonal tube 99 and constituting a bearing and guide for the same which will not require lubrication other than that provided by the bearing material itself.

The tube 94 preferably has a projection, lug, or pin 127 secured thereto or formed therein, said member 127 being slidably received within a slot 126 of the head member 85 as shown in Figs. 2, 3 and 4.

The top of the tubular member 94 is preferably provided with threads 109 cooperating with corresponding threads in a cap or nipple 110 which may be threaded upon the same. This cap or nipple preferably has a bore 111 serving as a free outlet for air and also has a recess 112 formed therein in which may be seated and cemented or otherwise secured a washer or pad 113 of suitable yieldable material, such as sponge rubber, felt or the like.

It will be noted that due to the fact that the bushing 129 is firmly securable to the tube 94 by means which will be described in detail hereinbelow, and the further fact that the tubular member 99 is of polygonal cross section, said tubular member 99 will be definitely correlated to the tube 94 as to its angular position, that is, the tubular member 99 cannot rotate with respect to the tubular member 94, but must keep its definite alinement with respect thereto.

The saw blade 44 is secured to the tubular member 99 by means of a chuck, designated generally as 114, indicated diagrammatically in Figs. 1 and 3.

The oilless bearing 129 is formed with preferably four notches 130 in the lower surface of the enlarged portion 105, said notches cooperating with suitable lugs or projections 131 formed in the flange 104 of the tube 94 so that by slightly lifting the bearing 129 it may be freely turned to engage the said slots 130 in any desired order with the cooperating lugs or projections. When the bearing 129 is thus engaged with the lugs it will be firmly held there by reason of the expansive force of the spring 98 which encircles the upper portion 106 of said oilless bearing as shown in Fig. 3.

It will be noted that the spring 98 has a dual function, namely, it will accomplish its main purpose of providing the motive power for returning the blade 44 to its initial position on its upstroke and at the same time it will serve the auxiliary purpose or function of urging the self-lubricating bearing or guide 129 against its seat on the flange 104 of the tube 94. These functions could, of course, be accomplished by separate springs or other means, if preferred.

Referring now to Fig. 10 it will be seen that it is possible to simplify the structure shown in Fig. 3 in several respects. In Fig. 10 the tube 94 is identical with the same tube of Fig. 3 with the exception that the air ports 96 and 97 are eliminated. In order to secure the same result that was produced by said air ports, in Fig. 10 the series of apertures 135 may be formed in the walls of the tubular member 99, and preferably in the upper portion of said member. It is obvious that these ports provide free communication between the space 136 above the disc 101 and the space 137 below the same, said communication being provided through the ports and through the interior of the tubular member 99 itself. By this construction the air may circulate freely from side to side of the disc 101 so that no appreciable resistance or damping will be produced. It will also be noted that the method of retaining the disc 101 with respect to the tubular member 99 has been materially simplified in the Fig. 10 form. The two bulges 100 and 102 of Fig. 3 have been eliminated and instead the disc 101 is held upon the tubular member 99 merely by bending outwardly certain portions of the tubular member 99 itself, as shown at 138.

In this construction the spring 98 performs not only a dual function but a triple function, namely, it retains the member 129 upon its seat on the flange 104 and also provides the power for returning the plunger upon its upward or return stroke, just as in the Fig. 3 form, and in addition serves also to hold the disc 101 against the outwardly bent flanges 138 of the said tubular member 99. It will be noted further that the yieldable or resilient element 140, equivalent to the corresponding element 113 of Fig. 3, is now made of somewhat larger diameter, namely, of a diameter sufficiently large to fit fairly well within the interior of the cap 141, which corresponds to the cap 110 of Fig. 3, so that it is not necessary to employ any cement or other means for retaining the said member 140 in the cap 141. This member is held in two independent ways, each of which is sufficient alone, namely it is held frictionally within the cap and it is also held by compression between the upper end of the tubular member 94 and the inner surface of the cap 141.

Referring to Figs. 7 and 8 it will be noted that these figures show a construction practically the same as that of Figs. 5 and 6, the chief difference being that whereas in Fig. 5 the oilless bearing member 129 has grooves or depressions 130 formed in its flange 105, said depressions being adapted to receive and cooperate with the raised portions or lugs 131 in the flange 104 of the tube 94, in Figs. 7 and 8 this construction is reversed and the oilless bearing 129 has lugs 132 formed in its flange 105 cooperating with grooves or depressions 133 in the flange 104 of the tube 94.

It is obvious that the same correlation may be obtained in either case, between the member 129 and the flange 104, but sometimes one or the other of these constructions may be preferred. For example, in certain cases it may be preferred to have the four grooves formed in one member or the other and to have less than four lugs or projections formed in the cooperating member. In such case it might be preferred to provide the grooves in the oilless bearing and to provide one or more pins or lugs in the flange 104. Fig. 9 shows a single lug 134.

Also, while four grooves and four cooperating lugs are mentioned, it is evident that it is not essential that such number be provided, inasmuch as a single projection or lug and three cooperating depressions or grooves will serve to hold the member 129 in its three most important positions of adjustment, namely, with the saw blade pointing straight forward and with the blade pointing at right angles to the forward position, that is, to the right or to the left respectively, these being the three positions of the saw blade customarily employed. It should, therefore, be understood that it is not at all necessary to have four grooves and four lugs in all cases, inasmuch as it is clear that most or all of the advantages of the invention may be attained with a smaller or larger number.

It is also obvious that while these grooves and lugs have been illustrated in positions suitable for orienting the saw blade into the three most usual positions, there is no reason why additional positions of adjustment could not also be provided for by suitably changing the number, location, etc., of the grooves and the lug or lugs cooperating therewith.

While the operation of the device is believed to be obvious from the above description of the structure, nevertheless it may be desirable to describe such operation in detail to avoid any possible lack of clearness.

Referring to Figs. 1 to 4, the saw blade 44 will be suitably inserted in the chuck 114 and properly secured therein by manipulating the thumb screw 117. Having secured the blade in position, the tube 94 will next be suitably adjusted with respect to the head 85 to produce the desired tension on the blade 44, which is accomplished by raising or lowering the tube 94 and noting the reading on the scale 95 opposite the top edge of the head 85, which is a measure of the compression to which the spring 98 has been subjected. It is clear that certain blades will require tensions different from other blades, for example, relatively fine blades will require less tension than the more rugged and heavy blades, in order to operate most satisfactorily. This adjustment is readily made by merely shifting the tube 94 up or down to the desired extent.

At the same time, the oilless bearing member 129 may be turned with respect to the said tube, this being accomplished by pushing up slightly on the projecting edge of the oilless bearing member 129 to release the lugs from the slots, and rotating it through a suitable extent in the desired direction to cause alinement of slots and lugs, when it is again released, and forced down by the spring 98. It is clear that the spring 98 will prevent the said bearing member from accidentally slipping off of the retaining lugs. Owing to this adjustability of the oilless bearing member itself it is unnecessary to provide any means permitting rotation of the tube 94 about its axis and a straight slot 126 of merely the proper width to accommodate the projection 127 slidably is provided.

By manipulating the bolt 90, by means of its handle 89, the tube 94 may then be secured firmly in the desired position of adjustment. In the event that the blade 44 should break, or slip out of either the upper chuck or the lower chuck, for any reason whatever, the spring 98 will cause the tube 99 to spring upward suddenly and such sudden springing would produce an undesirable shock and possible derangement and breakage if it were not for the yieldable pad or washer 113, which will receive the blow of the upper end of the plunger 99 and absorb the resulting shock. The opening 111 will permit the free escape of the air which would otherwise be compressed by the fibre or other washer 101, which else would act like a dash pot piston and produce undesired damping and waste of power.

However, it is clear that if the aperture 111 were made sufficiently restricted, it would also have the effect of providing a dash pot action in the case of accidental breakage or release of the saw blade 44 so that it would suitably restrain the movement of the plunger 99, due to the sudden compression of air between the fibre or other piston 101 and the cap or nipple 110, so that in certain cases, if preferred, it might even be possible or desirable to omit the yieldable element 113 without sacrificing entirely the advantage of absorbing the shock that would otherwise be produced. In such case, a sufficient normal outlet and inlet for the air may be provided by holes such as 96 and 97 in the tube, or the ports 135 of Fig. 10.

The operation of the modified forms shown in Figs. 7, 8 and 9, is, of course, practically identical with that of the form shown in Figs. 5 and 6, the only difference being that in one case the lug or lugs are disposed upon the flange 104 of the tube 94, whereas in the other case they are disposed upon the flange 105 of the bearing member 129.

This case is a continuation in part of my copending case Serial No. 669,587, filed May 5, 1933, for Scroll saws, and comprises that portion of the invention disclosed in said earlier case wherein the oilless bearing member is movably arranged within a non-rotatable tubular casing, whereas in the said prior case the said oilless bearing is claimed as stationary with respect to the said tubular casing and rotates together with the same as a whole.

Having described a preferred embodiment of the invention and a modification thereof, it will be understood that many changes, additions, omissions, etc., can be made therein without departing from the inventive idea, and, therefore, it is not to be considered as limited to the specific structures illustrated, but only as specified in the following claims.

I claim:

1. In a scroll saw, the combination of a reciprocatory plunger, means secured to the plunger, for holding an end of a saw blade, a guide for the said plunger, a tubular housing having a seat and supporting the said guide and enclosing a portion of the plunger, said housing having positioning means therein, the guide being provided with cooperating positioning means adapted to engage those of the housing in order to orient and seat the guide correctly, means bearing against the guide and urging the said guide yieldably but continuously against the said seat in the housing, a head supporting the said housing to be longitudinally adjustable but not rotatable therein and means cooperating with the said head for releasably securing the housing in its longitudinally adjusted position within the said head.

2. In a scroll saw, the combination of a reciprocatory plunger, means secured to the plunger, for holding an end of a saw blade, a guide for the said plunger, a tubular housing having a seat and supporting the said guide and enclosing a portion of the plunger, said housing having positioning means therein, the guide being provided with cooperating positioning means adapted to engage those of the housing in order to orient and seat the guide correctly, a spring bearing against the guide and urging the said guide continuously against the said seat in the housing, a head supporting the said housing to be longitudinally adjustable therein, means for preventing relative rotation thereof, and means cooperating with the said head for securing the housing in its longitudinally adjusted position within the said head.

3. In a scroll saw, the combination of a reciprocatory plunger, means secured to the plunger, for holding an end of a saw blade, a guide for the said plunger, a tubular housing supporting the said guide and enclosing a portion of the plunger, said housing having a flange provided with positioning means therein, the guide being provided with cooperating positioning means adapted to engage those of the flange, in order to orient and seat the guide correctly, means bearing against the guide and urging the said guide continuously but releasably against its seat in the flange, a head supporting the said housing adjustably therein and means cooperating with the said head for securing the housing in its adjusted position within the said head.

4. In a scroll saw, the combination of a reciprocatory plunger, means secured to the plunger, for holding an end of a saw blade, a guide for the said plunger, a guiding disc carried by the plunger near one end of the same, and a tubular housing supporting the said guide, and enclosing the portion of the plunger carrying the disc, there being a continuously open air passage entirely within the housing and connecting the spaces within the housing on opposite sides of the disc, to prevent compression of the air contained within the tubular housing when the disc is reciprocated.

5. In a scroll saw, the combination of a hollow reciprocatory plunger, means secured to the plunger, for holding an end of a saw blade, a guide for the said plunger, a guiding disc carried by the plunger near one end of the same, and a tubular housing supporting the said guide, and enclosing the portion of the plunger carrying the disc, there being an air passage including a portion of the bore of the plunger and connecting the spaces within the housing on opposite sides of the disc, to prevent compression of the air contained within the tubular housing when the disc is reciprocated.

6. In a scroll saw, the combination of a hollow reciprocatory plunger, means secured to the plunger, for holding an end of a saw blade, a guide for the said plunger, a guiding disc carried by the plunger near one end of the same, said end of the plunger being open, and a tubular housing supporting the said guide, and enclosing the portion of the plunger carrying the disc, said plunger being provided with at least one air vent in its wall, adjacent said disc, thus providing an air passage to prevent compression of the air contained within the tubular housing when the disc is reciprocated.

7. In a scroll saw, the combination of a reciprocatory plunger, of non-circular cross section, means secured to the plunger, for holding an end of a saw blade, a guide for the said plunger having a bore of corresponding shape, and a tubular housing supporting the said guide, said housing having a flange adjacent one end thereof, the guide bearing against said flange, and having spaced depressions, the flange having a projection adapted to enter into and cooperate with said depressions to retain the guide in selected positions and prevent rotation thereof with respect to the housing.

8. In a scroll saw, the combination of a reciprocatory plunger, means secured to the plunger, for holding an end of a saw blade, a flanged guide for the said plunger, a guiding disc carried by the plunger near one end of the same, said end of the plunger having an outward flare beyond the disc, a tubular housing having a flange adjacent one end thereof for supporting the said guide, said housing enclosing the portion of the plunger carrying the disc, the flange of the guide having a portion thereof cut away to provide a depression therein, the flange of the housing having a projection adapted to enter into and cooperate with said depression, and a spring surrounding portions of the plunger and of the guide, and bearing against the disc and the guide at its respective ends, thus holding the disc to the flare of the plunger and simultaneously holding the guide with the depression thereof cooperating with the projection on the flange of the housing.

9. In a scroll saw, the combination of a reciprocatory plunger, means secured to the plunger, for holding an end of a saw blade, a guide for the said plunger, a guiding disc carried by the plunger near one end of the same, a tubular housing rotatably supporting the said guide, and also supporting and guiding the disc, the housing having a portion projecting inwardly at one end thereof, the guide having a portion adapted to engage said inwardly projecting portion of the housing, said guide being thereby prevented from rotating with respect to the housing and means yieldably retaining said guide in engagement therewith.

10. In a scroll saw, the combination of a reciprocatory plunger, means secured to the plunger, for holding an end of a saw blade, a self-lubricating guide for the said plunger having a bore slidably but non-rotatably receiving the plunger, a tubular housing supporting the said guide, the housing having a portion projecting inwardly at one end thereof, the guide having a portion adapted to engage said inwardly projecting portion of the housing, said guide being thereby prevented from rotating with respect to the housing and means releasably retaining said guide in engagement therewith.

11. In a scroll saw, the combination of a reciprocatory plunger of non-circular cross section, means secured to the plunger, for holding an end of a saw blade, a self-lubricating guide for the said plunger having a bore the cross section of which corresponds to that of the plunger, a tubular housing supporting the said guide, the housing having a portion projecting inwardly at one end thereof, the guide having a portion adapted to engage said inwardly projecting portion of the housing, said guide being thereby prevented from rotating with respect to the housing and means releasably retaining said guide in engagement therewith.

12. In a scroll saw, the combination of a reciprocatory plunger of polygonal cross section, means secured to the plunger, for holding an end of a saw blade, a guide for slidably receiving the said plunger, a guiding disc carried by the plunger near one end of the same, a tubular housing rotatably supporting the said guide, and also supporting and guiding the disc, the housing having a portion projecting inwardly at one end thereof, the guide having a portion adapted to engage said inwardly projecting portion of the housing, said guide being thereby prevented from rotating with respect to the housing and means releasably retaining said guide in engagement therewith.

13. In a scroll saw, the combination of a reciprocatory plunger, means secured to the plunger for holding an end of a saw blade, a guide for the said plunger, a tubular housing, said guide fitting adjustably in said housing, a head supporting the said housing, said housing being longitudinally adjustable within said head, means for preventing relative rotation thereof, and means cooperating with said head for securing the housing in its longitudinally adjusted position within the said head.

14. In a scroll saw, the combination of a reciprocatory plunger, means secured to the plunger for holding an end of a saw blade, a guide for the said plunger, a tubular housing, said guide fitting adjustably in said housing, a head supporting the said housing, said housing being longitudinally adjustable within said head, means for preventing relative rotation thereof, and means cooperating with said head for securing the housing in its longitudinally adjusted position within the said head, said tubular housing having a scale on its outer surface, a portion of the head serving as a reading point for said scale in order to indicate the position of the housing.

15. In a scroll saw, the combination of a reciprocatory plunger, means secured to the plunger, for holding an end of a saw blade, a guide for the said plunger, a disc secured to the plunger near one end of the same, a tubular housing supporting the said guide, and enclosing the portion of the plunger carrying the disc, said housing having positioning means therein, the guide being provided with cooperating positioning means adapted to engage those of the housing in order to orient the guide correctly, a head supporting the said housing to be longitudinally adjustable therein means for preventing relative rotation of the head and housing, and means cooperating with the said head for securing the housing in its longitudinally adjusted position within the said head.

16. In a scroll saw, the combination of a reciprocatory plunger, means secured to the plunger, for holding an end of a saw blade, a guide for the said plunger, a disc secured to the plunger near one end of the same, a tubular housing supporting the said guide, and enclosing the portion of the plunger carrying the disc, said housing having positioning means therein, the guide being provided with cooperating positioning means adapted to engage those of the housing in order to orient and seat the guide correctly, a spring bearing against the guide and against the disc and thus urging the guide continuously against its seat in the housing, a head supporting the said housing to be longitudinally adjustable therein, means for preventing relative rotation thereof, and means cooperating with the said head for securing the housing in its longitudinally adjusted position within the said head.

HERBERT E. TAUTZ.